UNITED STATES PATENT OFFICE.

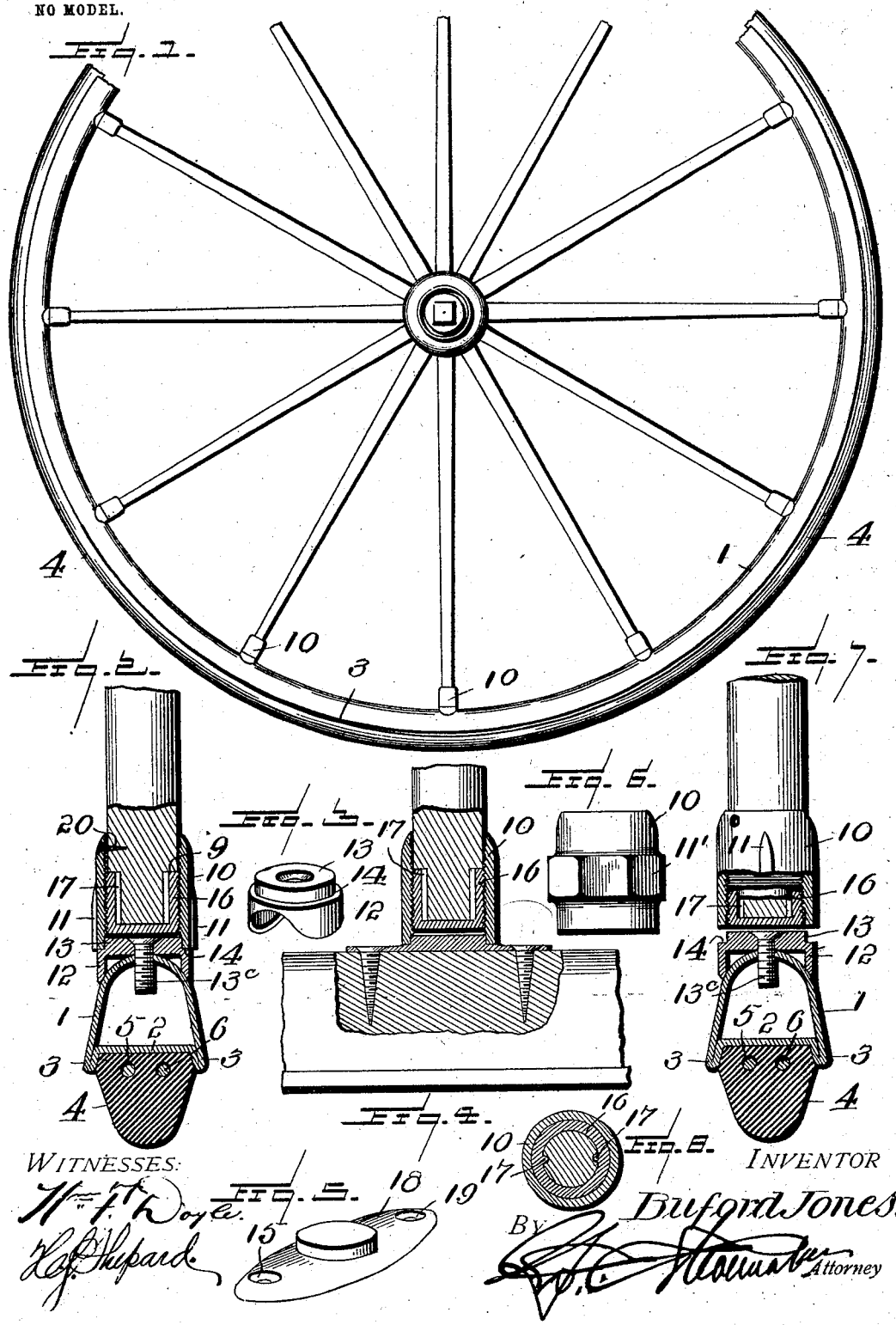

BUFORD JONES, OF MOORESVILLE, TENNESSEE.

VEHICLE-WHEEL.

SPECIFICATION forming part of Letters Patent No. 718,468, dated January 13, 1903.

Application filed October 25, 1902. Serial No. 128,731. (No model.)

*To all whom it may concern:*

Be it known that I, BUFORD JONES, a citizen of the United States, residing at Mooresville, in the county of Marshall and State of Tennessee, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to vehicle-wheels, and has for its object to provide an improved wheel wherein the spokes and the rim may be conveniently and effectively tightened and loosened. It is furthermore designed to obviate mortise-and-tenon joints between the spokes and the rim, so as to materially increase the strength and life of the wheel and also to facilitate the fitting of a new spoke in the place of a broken one.

Another object of the invention is to have the improvements applicable to both metallic and wooden wheels, and in particular to provide for applying the same to wooden wheels already in use, for convenience in replacing worn or broken spokes, and for tightening the wheel.

Other objects and advantages of the invention will be understood from the following description when considered in connection with the accompanying drawings.

In the drawings, Figure 1 is a view of a wheel embodying the features of the present invention. Fig. 2 is a sectional view taken through the joint between one of the spokes and the rim. Fig. 3 is a detail perspective view of the clip member for attachment to the rim. Fig. 4 is a sectional view showing the invention applied to a wooden rim. Fig. 5 is a detail perspective view of the clip member to be applied to a wooden rim; and Fig. 6 is an elevation of the sleeve, disclosing a modified form of wrench-seat. Fig. 7 is a sectional view taken through the joint between one of the spokes and the rim, showing the spoke terminated short of the rim with the sleeve member of the joint out of contact with its seat and in such a position that it may be worked down upon the latter. Fig. 8 is a horizontal section of the outer end of a spoke equipped with the joint connections above the rim, showing the means for preventing rotation of the ferrule upon the spoke.

Like characters of reference designate corresponding parts in all the views of the drawings.

Referring at first more particularly to Figs. 1, 2, and 3 of the drawings, the character 1 designates a hollow or tubular metallic rim having an externally-convexed back, with its tread portion 2 bent or struck inwardly and flat or straight transversely. The bent portions 3 between the tread and sides of the rim form opposite annular flanges, which, together with the tread, form an annular channel or seat for the solid rubber tire 4, the latter having a pair of longitudinal perforations 5 for the reception of the wires 6.

As hereinbefore intimated, the joint between each spoke and the rim is adjustable to tighten or loosen the spoke, and this feature is carried out as follows: The outer end of the spoke is terminated short of the rim and is slightly reduced to form an annular shoulder 9, and a sleeve 10, which is open at its ends, is fitted upon the outer end of the spoke, so as to rotate thereon, the said sleeve being greater in length than the reduced portion of the spoke, so as to overlap the shoulder, and of such an internal diameter as to permit of the sleeve being slipped above the post 13, as indicated in Fig. 7. This sleeve is internally screw-threaded and is provided with oppositely-disposed external ribs 11, which form a wrench-seat for convenience in turning the sleeve. If desired, the sleeve may be provided with an intermediate external polygonal portion 11' to form a wrench-seat, as shown in Fig. 6; but in any event the inner portion of the outer end of the sleeve must be cylindrical.

As clearly shown in Fig. 2 of the drawings, it will be seen that the screw-threads of the sleeve are at an intermediate portion only—that is to say, they terminate short of the opposite ends of the sleeve in order that the latter may have smooth terminals. Furthermore, the lower or outer smooth terminal portion is slightly greater in diameter than the screw-threaded portion. Exteriorly the upper end of the sleeve is slightly tapered and interiorly contracted, so as to fit the spoke comparatively tight, and thereby prevent accumulations of foreign matter between the sleeve and the spoke, as such an accumulation would likely interfere with the rotation of the sleeve.

In the space between the outer end of the spoke and the rim there is an inverted substantially U-shaped metallic clip 12, which snugly embraces the rounded back of the rim, this clip 12 being provided with a circular head. Rising centrally from the top or head of the clip is a central post, stud, or projection 13, slightly smaller in diameter than the head, thereby forming an annular seat 14, upon which the lower or outer end of the sleeve is rotatably fitted, the part 13 being of a diameter approximately the same as the diameter of the lower internal smooth end of the sleeve, whereby the sleeve may rotate upon the post, but lateral movement thereof be prevented, owing to the part 13 projecting upwardly therein to the edge of the threaded portion thereof. A screw-fastening 13° is set centrally through the head of the clip and into the back of the rim, so as to hold the clip in place. It will here be noted that the part 13 forms a cylindrical post upon which the outer smooth end of the sleeve is swiveled to rotate and that owing to the sleeve snugly fitting upon the post rattling of the spoke and its joint is prevented, as is also lateral movement, as hereinbefore stated.

Fitted upon the outer or reduced end of the spoke, with the shoulder of the latter resting upon its upper edge, is a cap or ferrule 16, the extreme outer reduced end of the spoke resting against the closed end of the said cap or ferrule. This cap or ferrule is exteriorly screw-threaded to fit the interiorly-screw-threaded portion of the sleeve and is provided with internal ribs or projections 17, which are adapted to be embedded in the corresponding grooves or recesses in the sides of the outer reduced end of the spoke, so that rotation of the cap or ferrule upon the spoke might be prevented.

It will now be understood that the sleeve 10 is rotatable at one end upon the spoke and at its opposite end upon the rim, with an intermediate screw-threaded connection with the cap or ferrule, whereby upon rotation of the sleeve it may be fed outward or inward to in effect lengthen or shorten the spoke, and thereby tighten or loosen the spoke or rim, it being understood that the ferrule might, if desired, be eliminated from the structure, the reduced end of the spoke being threaded as a substitute for the ferrule.

By reference to Figs. 4 and 5 of the drawings it will be seen that the socket or tightener is also applicable to wooden rims without any alteration or change in the essential parts, with the exception that for a rim having a flat back or inner edge the clip 18, which corresponds to the clip 12, is in the form of a flat plate, as shown, with terminal perforations 19 for the reception of fastenings to secure the plate to the rim. Should the back or inner edge of the rim be of a rounded form, it is obvious that the flat plate or the clip may be made to conform therewith.

In assembling the present device, the clip being in place upon the rim, the sleeve is slipped upon the outer end of the spoke beyond the shoulder, and then the ferrule is fitted to the reduced end of the spoke. With a wooden spoke the ferrule may be driven thereon, whereby the ribs 17 are embedded in the spoke. Should the spoke be of metal, it would be necessary to provide the same with grooves or recesses to receive the ribs, it being understood, however, that the grooves may be first formed in the wooden spokes and that whether the ribs form the grooves or rest within previously-prepared grooves the ribs are considered to be embedded therein. After the ferrule has been fitted in place the sleeve is slipped into engagement with the threads thereof and then rotated to be fed outwardly and to embrace the post on the rim, whereby further rotation increases the length of the spoke and tightens the rim. When the desired degree of tightness has been secured, a fastening 20 is set through a perforation of the sleeve and into the spoke to prevent the sleeve from working loose, and thereby loosening the wheel, it being understood that any other form of fastening means may be employed for this purpose.

Although the invention has been illustrated and described in detail, it will be understood that this disclosure exhibits but one of several embodiments of the invention, and therefore changes in form, proportion, size, and minor details may be resorted to within the scope of the claim without departing from the spirit or sacrificing any of the advantages of the invention.

Having thus described my invention, what I claim, and desire to secure by Letters Patent, is—

A spoke-joint comprising a clip having means for attachment to the back of a rim and also provided with a reduced smooth post, an exteriorly-screw-threaded ferrule open at one end to receive a spoke and closed at its opposite end and provided with internal projections, an open-ended sleeve having an intermediate internally-screw-threaded portion, the opposite end portions of the sleeve being internally smooth with one smooth end to rotatably embrace the post and the opposite smooth end to rotatably embrace the spoke above the upper end of the ferrule, and a fastening piercing the sleeve to prevent accidental rotation thereof.

In testimony whereof I affix my signature in presence of two witnesses.

BUFORD JONES.

Witnesses:
W. D. FOX,
J. V. ORR.